(12) United States Patent
Xu et al.

(10) Patent No.: US 11,402,196 B2
(45) Date of Patent: Aug. 2, 2022

(54) DEVICE AND METHOD FOR DISTRIBUTED DETECTION OF STRAIGHTNESS OF WORKING FACE OF SCRAPER CONVEYOR BASED ON OPTICAL FIBER SENSING

(71) Applicant: China University of Mining and Technology, Suzhou (CN)

(72) Inventors: Shaoyi Xu, Jiangsu (CN); Zhencai Zhu, Jiangsu (CN); Wei Li, Jiangsu (CN); Yuqiao Wang, Jiangsu (CN); Fangfang Xing, Jiangsu (CN); Hongyu Xue, Jiangsu (CN); Qiang Peng, Jiangsu (CN); Feng Dong, Jiangsu (CN); Guang Chen, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 17/422,756

(22) PCT Filed: Apr. 21, 2020

(86) PCT No.: PCT/CN2020/085886
§ 371 (c)(1),
(2) Date: Jul. 14, 2021

(87) PCT Pub. No.: WO2021/139037
PCT Pub. Date: Jul. 15, 2021

(65) Prior Publication Data
US 2022/0144554 A1   May 12, 2022

(30) Foreign Application Priority Data
Jan. 9, 2020   (CN) .......................... 202010022172.4

(51) Int. Cl.
*G01B 11/24*   (2006.01)
*B65G 19/22*   (2006.01)
(Continued)

(52) U.S. Cl.
CPC .............. *G01B 11/24* (2013.01); *B65G 19/22* (2013.01); *B65G 43/00* (2013.01); *E21F 13/066* (2013.01);
(Continued)

(58) Field of Classification Search
CPC .......... G01H 9/00; G01H 9/004; G01H 9/006; G01C 9/00; G01C 9/02; G01C 2009/066;
(Continued)

(56) References Cited

U.S. PATENT DOCUMENTS

| 10,494,925 | B1* | 12/2019 | Yan | B65G 23/44 |
| 2019/0390985 | A1* | 12/2019 | Kwok | G01L 1/246 |
| 2021/0078060 | A1* | 3/2021 | Magne | G01B 11/26 |

FOREIGN PATENT DOCUMENTS

| CN | 1335482 | 2/2002 |
| CN | 103292980 | 9/2013 |

(Continued)

OTHER PUBLICATIONS

"International Search Report (Form PCT/ISA/210) of PCT/CN2020/085886," dated Sep. 29, 2020, pp. 1-5.
(Continued)

*Primary Examiner* — Gordon J Stock, Jr.
(74) *Attorney, Agent, or Firm* — JCIPRNET

(57) ABSTRACT

Disclosed is a device and method for distributed detection of straightness of a working face of a scraper conveyor based on optical fiber sensing. The device includes a broadband light source, a first optical fiber circulator array, a second optical fiber circulator array, a collimator array, a reflecting film array, a third optical fiber circulator array, and an optical path analyzer. During transmission of light emitted from the broadband light source, the light with different wavelengths is separated via several optical gratings etched on a single-mode optical fiber (SMF), and reaches reflecting films
(Continued)

adhered to the working face of the scraper conveyor through first optical fiber circulators, second optical fiber circulators, and collimators. The light with the different wavelengths is then reflected back from the reflecting films, enters the SMF through third optical fiber circulators, and finally enters the optical path analyzer.

4 Claims, 1 Drawing Sheet

(51) Int. Cl.
*B65G 43/00* (2006.01)
*G02B 6/38* (2006.01)
*E21F 13/06* (2006.01)
*G01B 11/30* (2006.01)
*G01B 11/26* (2006.01)

(52) U.S. Cl.
CPC ............ *G01B 11/26* (2013.01); *G01B 11/306* (2013.01); *G02B 6/385* (2013.01); *B65G 2203/04* (2013.01)

(58) Field of Classification Search
CPC ...... G01C 15/10; G01C 15/105; G02B 6/385; G01D 5/26; G01D 5/264; G01D 5/266; G01D 5/268; G01D 5/28; G01D 5/30; G01D 5/353; G01D 5/35303; G01D 5/35306; G01D 5/35309; G01D 5/35312; G01D 5/35316; G01D 5/35354; G01D 5/35338; G01D 5/35367; G01D 5/3537; G01D 5/35374; G01D 5/35383; G01B 11/16; G01B 11/18; G01B 11/24; G01B 11/245; G01B 11/255; G01B 11/26; G01B 11/27; G01B 11/272; G01B 11/30; G01B 11/303; G01B 11/306; B65G 43/00; B65G 43/02; B65G 2203/00; B65G 2203/02; B65G 2203/0266; B65G 2203/0275; B65G 2203/0283; B65G 2203/04; B65G 2203/044; B65G 19/18; B65G 19/185; B65G 19/2228; E21F 13/066; E21F 13/068; G01M 11/08; G01M 11/083; G01M 11/085
See application file for complete search history.

(56) References Cited

FOREIGN PATENT DOCUMENTS

| | | | | |
|---|---|---|---|---|
| CN | 103912294 | | 7/2014 | |
| CN | 107883985 A | * | 4/2018 | ............ B65G 43/02 |
| CN | 108033203 | | 5/2018 | |
| CN | 109341593 | | 2/2019 | |
| CN | 110057324 | | 7/2019 | |
| CN | 111397542 A | * | 7/2020 | ........... G01B 11/272 |
| CN | 112033301 B | * | 5/2021 | ............ G01B 11/24 |
| CN | 113899326 A | * | 1/2022 | ............ G01B 11/27 |
| SU | 875106 | | 10/1981 | |

OTHER PUBLICATIONS

"Written Opinion of the International Searching Authority (Form PCT/ISA/237) of PCT/CN2020/085886," dated Sep. 29, 2020, with English translation thereof, pp. 1-6.

* cited by examiner

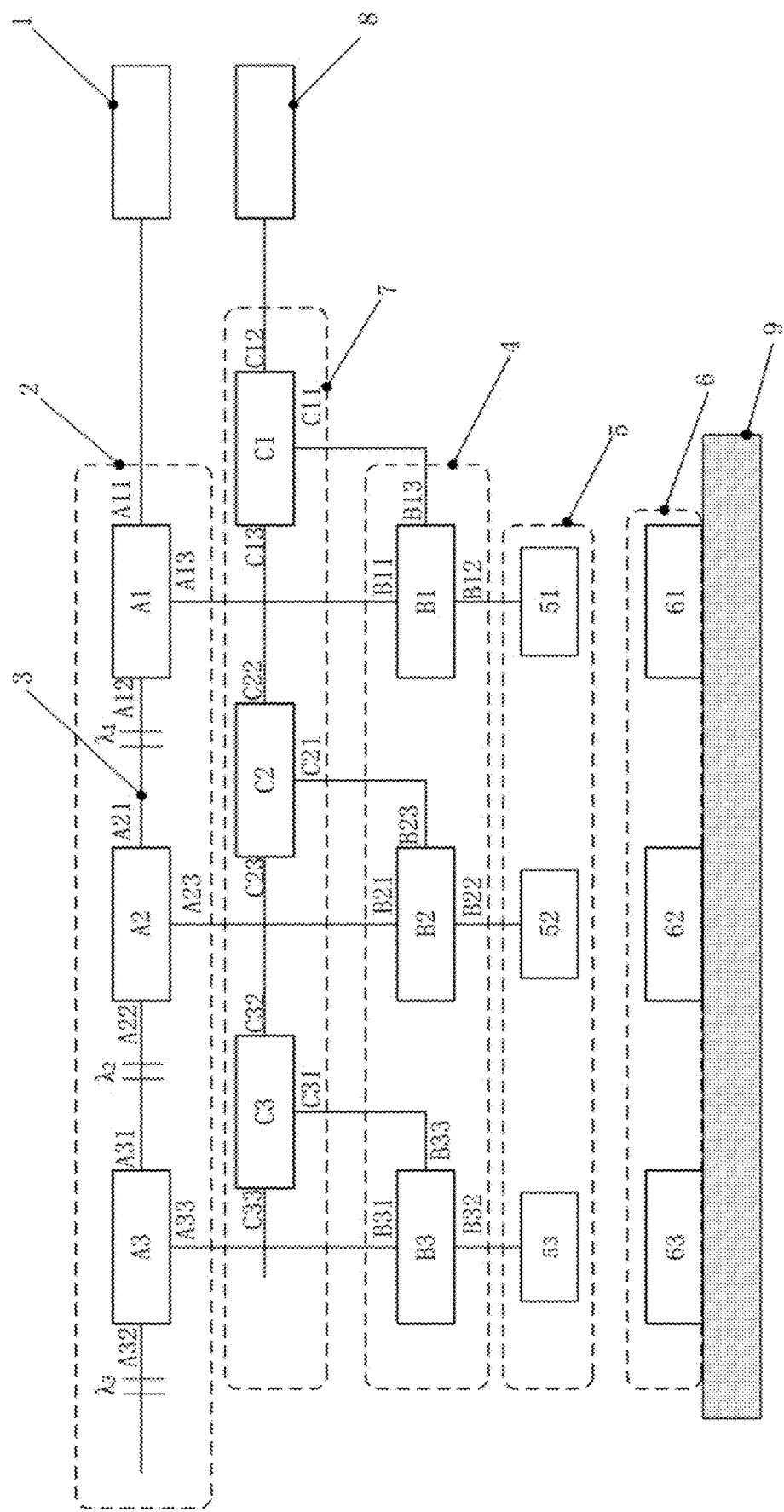

DEVICE AND METHOD FOR DISTRIBUTED DETECTION OF STRAIGHTNESS OF WORKING FACE OF SCRAPER CONVEYOR BASED ON OPTICAL FIBER SENSING

CROSS-REFERENCE TO RELATED APPLICATION

This application is a 371 of international application of PCT application serial no. PCT/CN2020/085886, filed on Apr. 21, 2020, which claims the priority benefit of China application no. 202010022172.4, filed on Jan. 9, 2020. The entirety of each of the above mentioned patent applications is hereby incorporated by reference herein and made a part of this specification.

BACKGROUND OF THE INVENTION

Field of the Invention

The present invention belongs to the field of monitoring of a working state of fully-mechanized mining equipment in a mine; and relates to distributed detection of straightness of a working face of a scraper conveyor, and in particular, to a device and method for distributed detection of straightness of a working face of a scraper conveyor based on optical fiber sensing.

Description of Related Art

A scraper conveyor is one of the key equipment on the fully-mechanized coal mining face, and its performance directly affects mine safety and a production level. In addition to transporting coal, the scraper conveyor can also be used as a moving track for a shearer and a pivot point for a hydraulic support. If the straightness of the scraper conveyor in a running direction is poor, the wear and tear of a scraper chain is aggravated, and further the safety of coal production is affected. Moreover, because the shearer reciprocates with the scraper conveyor as the running track, relatively poor straightness may cause an error in cutting displacement. Therefore, it is rather important to ensure that the scraper conveyor runs in a straight line.

The existing straightness detection means are mainly as follows: Gyroscope-based inertial navigation technology is used to draw a travelling track of the shearer to obtain the straightness of a working face of the scraper conveyor. However, the gyroscope apparatus is expensive, bringing a high cost. Laser calibration is conducted on the scraper conveyor and a high-definition camera is used to capture images to obtain the straightness of the working face of the scraper conveyor. However, this method has relatively low measurement precision and the captured images are unsharp in a high-dust condition. A laser distance meter is installed on a hydraulic support to detect the position of the hydraulic support relative to the scraper conveyor, thus indirectly measuring the straightness of the working face of the scraper conveyor. However, it is difficult to implement this method because the support may pitch during movement.

SUMMARY OF THE INVENTION

One objective of the present invention is to provide a device for distributed detection of straightness of a working face of a scraper conveyor based on optical fiber sensing, which has a simple structure, high resistance to electromagnetic interference, and high precision.

Another objective of the present invention is to provide a detection method of the above-described device for distributed detection of straightness of a working face of a scraper conveyor based on optical fiber sensing, which can realize direct measurement of the straightness of the working face of the scraper conveyor.

To achieve the foregoing objectives, the present invention adopts the following technical solutions: A device for distributed detection of straightness of a working face of a scraper conveyor based on optical fiber sensing is provided, including: a broadband light source, a first optical fiber circulator array, a second optical fiber circulator array, a collimator array, a reflecting film array, a third optical fiber circulator array, and an optical path analyzer, where the first optical fiber circulator array includes a plurality of first optical fiber circulators A which are successively connected in series via a fiber grating, and single-mode optical fibers (SMFs) connected at second ports of the plurality of first optical fiber circulators A are etched with Bragg gratings with central wavelengths of $\lambda_1, \lambda_2 \ldots \lambda_n$ respectively; the broadband light source is connected in series to the first optical fiber circulator array via an SMF; the second optical fiber circulator array includes a plurality of second optical fiber circulators B, and the collimator array includes a plurality of collimators arranged at equal intervals; the reflecting film array includes a plurality of reflecting films adhered to the working face in a running direction of the scraper conveyor, and an array interval between the reflecting films is equal to that between the collimators; and the third optical fiber circulator array includes a plurality of third optical fiber circulators C successively connected in series via an SMF, and the optical path analyzer is connected in series to the third optical fiber circulator array via an SMF.

The first optical fiber circulator array, the second optical fiber circulator array, the collimator array, and the third optical fiber circulator array are arranged in a direction parallel to an arrangement direction of the reflecting film array; and equal numbers of the first optical fiber circulators A, the second optical fiber circulators B, the collimators, the reflecting films, and the third optical fiber circulators C are arranged. Third ports of the first optical fiber circulators A are connected to first ports of the second optical fiber circulators B respectively, second ports of the second optical fiber circulators B are connected to the collimators respectively, and third ports of the second optical fiber circulators B are connected to first ports of the third optical fiber circulators C respectively.

Preferably, the arrangement numbers of the first optical fiber circulators A, the second optical fiber circulators B, the collimators, the reflecting films, and the third optical fiber circulators C are all not less than three.

Preferably, the reflecting film is a thin sheet coated with a metal film on the surface and having a thickness less than 1 mm.

The present invention further provides a detection method of the above-described device for distributed detection of straightness of a working face of a scraper conveyor based on optical fiber sensing.

A broadband spectrum output by a broadband light source enters a first optical fiber circulator A1 ranked first from a first port of the first optical fiber circulator A1, and is then output from a second port of the first optical fiber circulator A1. The light output from the second port of the first optical fiber circulator A1 reaches a first optical grating and light with a wavelength of $\lambda_1$ is returned. The light with the wavelength of $\lambda_1$ enters a second optical fiber circulator B1 ranked first through a first port of the second optical fiber circulator B1, and reaches a first reflecting film through a first collimator after being output from a second port of the second optical fiber circulator B1. The light with the wavelength of $\lambda_1$ returns back to the second optical fiber circulator B1 through the first collimator from the second port of the second optical fiber circulator B1 under the effect of the first reflecting film, and is output from a third port of the second optical fiber circulator B1. The light output from the third port of the second optical fiber circulator B1 enters a third optical fiber circulator C1 ranked first through a first port of the third optical fiber circulator C1, and enters an optical path analyzer through an SMF after being output from a second port of the third optical fiber circulator C1.

Light of the remaining wavelength that is not returned after the light is output from the second port of the first optical fiber circulator A1 and reaches the first optical grating is continuously transmitted forward, enters from a first port of a first optical fiber circulator A2 ranked second, and is output from a second port of the first optical fiber circulator A2. The light output from the second port of the first optical fiber circulator A2 reaches a second optical grating and light with a wavelength of $\lambda_2$ is returned. The light with the wavelength of $\lambda_2$ enters a second optical fiber circulator B2 ranked second through a first port of the second optical fiber circulator B2, and reaches a second reflecting film through a second collimator after being output from a second port of the second optical fiber circulator B2. The light with the wavelength of $\lambda_2$ returns back to the second optical fiber circulator B2 through the second collimator from the second port of the second optical fiber circulator B2 under the effect of the second reflecting film, and is output from a third port of the second optical fiber circulator B2. The light output from the third port of the second optical fiber circulator B2 enters a third optical fiber circulator C2 ranked second through a first port of the third optical fiber circulator C2, and enters the optical path analyzer through an SMF after being output from a second port of the third optical fiber circulator C2.

Light of the remaining wavelength that is not returned after the light is output from the second port of the first optical fiber circulator A2 and reaches the second optical grating is continuously transmitted forward, and the rest is deduced by analogy; therefore, light with the wavelengths of $\lambda_1, \lambda_2, \lambda_3, \ldots, \lambda_n$ all enters the optical path analyzer through the SMF. The optical path analyzer calculates transmission distances of the different wavelengths of light, to obtain positions of different reflecting films. Because the position points of the reflecting films are corresponding to positions on the scraper conveyor, the straightness of a working face of the scraper conveyor in a running direction is obtained according to connecting lines between the position points.

Compared to the prior art, the present invention realizes positioning of points on a working face according to information of path lengths at which different wavelengths of light are reflected back after reaching the working face. Based on this ingenious concept, after obtaining positions of the different points on the working face in a running direction of a scraper conveyor, the present invention realizes detection of the straightness of the working face according to these position points. The present invention has such advantages as high resistance to electromagnetic interference, a simple structure, and high measurement precision.

BRIEF DESCRIPTION OF THE DRAWINGS

FIG. 1 is a schematic principle diagram of an optical path in an embodiment of the present invention.

Meanings of numerals: 1. Broadband light source, 2. First optical fiber circulator array, 3. Fiber grating, 4. Second optical fiber circulator array, 5. Collimator array, 6. Reflecting film array, 7. Third optical fiber circulator array, 8. Optical path analyzer, 9. Working face of a scraper conveyor.

DETAILED DESCRIPTION OF THE INVENTION

The present invention is further described in detail below with reference to the accompanying drawing and a specific embodiment.

As shown in FIG. 1, a device for distributed detection of straightness of a working face of a scraper conveyor based on optical fiber sensing includes a broadband light source 1, a first optical fiber circulator array 2, a second optical fiber circulator array 4, a collimator array 5, a reflecting film array 6, a third optical fiber circulator array 7, and an optical path analyzer 9. The first optical fiber circulator array 2 includes first optical fiber circulators A1, A2, and A3 which are successively connected in series via a fiber grating 3, and the fiber grating 3 is etched with a grating array. An SMF between the first optical fiber circulators A1 and A2 is etched with a Bragg grating with a central wavelength of $\lambda_1$, an SMF between the first optical fiber circulators A2 and A3 is etched with a Bragg grating with a central wavelength of $\lambda_2$, and an SMF connected at a second port of the first optical fiber circulator A3 is etched with a Bragg grating with a central wavelength of $\lambda_3$. The broadband light source 1 is connected in series to the first optical fiber circulator array 2 via an SMF.

The second optical fiber circulator array 4 includes second optical fiber circulators B1, B2, and B3; and the collimator array 5 includes collimators 51, 52, and 53 arranged at equal intervals. The reflecting film array 6 includes reflecting films 61, 62, and 63 adhered to a working face 9 in a running direction of the scraper conveyor, where the three reflecting films are spaced at intervals equal to the intervals between the three collimators, and the reflecting film is a thin sheet coated with a metal film on the surface and having a thickness less than 1 mm. The third optical fiber circulator array 7 includes third optical fiber circulators C1, C2, and C3 successively connected in series via an SMF. The optical path analyzer 8 is connected in series to the third optical fiber circulator array 7 via an SMF.

The first optical fiber circulator array 2, the second optical fiber circulator array 4, the collimator array 5, and the third optical fiber circulator array 7 are arranged in a direction parallel to an arrangement direction of the reflecting film array 6. A third port A13 of the first optical fiber circulator A1 is connected to a first port B11 of the second optical fiber circulator B1; a second port B12 of the second optical fiber circulator B1 is connected to the collimator 51; a third port B13 of the second optical fiber circulator B1 is connected to a first port C11 of the third optical fiber circulator C1; a third port A23 of the first optical fiber circulator A2 is connected to a first port B21 of the second optical fiber circulator B2; a second port B22 of the second optical fiber circulator B2 is connected to the collimator 52; a third port B23 of the second optical fiber circulator B2 is connected to a first port C21 of the third optical fiber circulator C2; a third port A33 of the first optical fiber circulator A3 is connected to a first port B31 of the second optical fiber circulator B3; a second port B32 of the second optical fiber circulator B3 is connected to the collimator 53; and a third port B33 of the second optical fiber circulator B3 is connected to a first port C31 of the third optical fiber circulator C3.

In the first optical fiber circulator array 2, an optical transmission path between ports A11 and A12 of the first optical fiber circulator A1 is unidirectional, and an optical transmission path between the ports A12 and A13 of the first optical fiber circulator A1 is unidirectional; an optical transmission path between ports A21 and A22 of the first optical fiber circulator A2 is unidirectional, and an optical transmission path between the ports A22 and A23 of the first optical fiber circulator A2 is unidirectional; and an optical transmission path between ports A31 and A32 of the first optical fiber circulator A3 is unidirectional, and an optical transmission path between the ports A32 and A33 of the first optical fiber circulator A3 is unidirectional.

In the second optical fiber circulator array 4, an optical transmission path between the ports B11 and B12 of the second optical fiber circulator B1 is unidirectional, and an optical transmission path between the ports B12 and B13 of the second optical fiber circulator B1 is unidirectional; an optical transmission path between the ports B21 and B22 of the second optical fiber circulator B2 is unidirectional, and an optical transmission path between the ports B22 and B23 of the second optical fiber circulator B2 is unidirectional; and an optical transmission path between the ports B31 and B32 of the second optical fiber circulator B3 is unidirectional, and an optical transmission path between the ports B32 and B33 of the second optical fiber circulator B3 is unidirectional.

In the third optical fiber circulator array 7, an optical transmission path between the ports C11 and C12 of the third optical fiber circulator C1 is unidirectional, and an optical transmission path between the ports C12 and C13 of the third optical fiber circulator C1 is unidirectional; an optical transmission path between the ports C21 and C22 of the third optical fiber circulator C2 is unidirectional, and an optical transmission path between the ports C22 and C23 of the third optical fiber circulator C2 is unidirectional; and an optical transmission path between the ports C31 and C32 of the third optical fiber circulator C3 is unidirectional, and an optical transmission path between the ports C32 and C33 of the third optical fiber circulator C3 is unidirectional.

A broadband spectrum output by the broadband light source 1 enters the first optical fiber circulator A1 from the port A11 of the first optical fiber circulator A1, and is then output from the port A12. The light output from the port A12 reaches a first optical grating and light with a wavelength of $\lambda_1$ is returned. Light of the remaining wavelength is continuously transmitted forward, enters the first optical fiber circulator A2 through the port A21 of the first optical fiber circulator A2, and is output from the port A22. The light output from the port A22 reaches a second optical grating and light with a wavelength of $\lambda_2$ is returned. Light of the remaining wavelength is continuously transmitted forward, enters the first optical fiber circulator A3 through the port A31 of the first optical fiber circulator A3, and is output from the port A32. The light output from the port A32 reaches a third optical grating and light with a wavelength of $\lambda_3$ is returned. Light of the remaining wavelength is continuously transmitted forward.

The returned light with the wavelengths of $\lambda_1$, $\lambda_2$, and $\lambda_3$ enters the second optical fiber circulators B1, B2, and B3 respectively through the port B11 of the second optical fiber circulator B1, the port B21 of the second optical fiber circulator B2, and the port B31 of the second optical fiber circulator B3; and then is output from the ports B12, B22, and B32 respectively.

The light output from the ports B12, B22, and B32 reaches the reflecting films 61, 62, and 63 respectively through the collimators 51, 52, and 53.

The light with the wavelength of $\lambda_1$ returns back to the second optical fiber circulator B1 via the collimator 51 through the port B12 under the effect of the reflecting film 61, and is output from the port B13. The light with the wavelength of $\lambda_2$ returns back to the second optical fiber circulator B2 via the collimator 52 through the port B22 under the effect of the reflecting film 62, and is output from the port B23. The light with the wavelength of $\lambda_3$ returns back to the second optical fiber circulator B3 via the collimator 53 through the port B32 under the effect of the reflecting film 63, and is output from the port B33.

The light output from the ports B13, B23, and B33 enters the third optical fiber circulators C1, C2, and C3 respectively through the port C11 of the third optical fiber circulator C1, the port C21 of the third optical fiber circulator C2, and the port C31 of the third optical fiber circulator C3; and then is output respectively through the ports C12, C22 and C32.

The light with the wavelengths of $\lambda_1$, $\lambda_2$, and $\lambda_3$ output from the ports C12, C22 and C32 enters the optical path analyzer 8 via the SMF, and the optical path analyzer 8 calculates transmission distances of the different wavelengths of light, to obtain positions of the different reflecting films. Because the position points of the reflecting films are corresponding to positions on the scraper conveyor, the straightness of the working face of the scraper conveyor in the running direction can be obtained according to connecting lines between the position points.

The above merely describes a preferred embodiment of the present invention, and is not intended to limit the present invention in any form. Based on the embodiment of the present invention, all other embodiments obtained by those of ordinary skill in the art without creative work shall fall within the scope of protection of the present invention. Any simple modifications and equivalent changes made to the foregoing embodiment according to the technical essence of the present invention all fall within the scope of protection of the present invention.

What is claimed is:

1. A device for distributed detection of straightness of a working face of a scraper conveyor based on optical fiber sensing, comprising a broadband light source, a first optical fiber circulator array, a second optical fiber circulator array, a collimator array, a reflecting film array, a third optical fiber circulator array, and an optical path analyzer, wherein the first optical fiber circulator array comprises a plurality of first optical fiber circulators which are successively connected in series via a fiber grating, and single-mode optical fibers (SMFs) connected at second ports of the plurality of first optical fiber circulators are etched with Bragg gratings with central wavelengths $\lambda_1, \lambda_2, \ldots, \lambda_n$ respectively; the broadband light source is connected in series to the first optical fiber circulator array via an SMF; the second optical fiber circulator array comprises a plurality of second optical fiber circulators, and the collimator array comprises a plurality of collimators arranged at equal intervals; the reflecting film array comprises a plurality of reflecting films adhered to the working face of the scraper conveyor in a running direction of the scraper conveyor, and an array interval between the reflecting films is equal to that between the collimators; and the third optical fiber circulator array comprises a plurality of third optical fiber circulators successively connected in series via an SMF, and the optical path analyzer is connected in series to the third optical fiber circulator array via an SMF;

the first optical fiber circulator array, the second optical fiber circulator array, the collimator array, and the third optical fiber circulator array are arranged in a direction parallel to an arrangement direction of the reflecting film array; equal numbers of the first optical fiber circulators, the second optical fiber circulators, the collimators, the reflecting films, and the third optical fiber circulators are arranged; third ports of the first optical fiber circulators are connected to first ports of the second optical fiber circulators respectively, second ports of the second optical fiber circulators are connected to the collimators respectively, and third ports of the second optical fiber circulators are connected to first ports of the third optical fiber circulators respectively.

2. The device for distributed detection of straightness of the working face of the scraper conveyor based on optical fiber sensing according to claim 1, characterized in that, the arrangement numbers of the first optical fiber circulators, the second optical fiber circulators, the collimators, the reflecting films, and the third optical fiber circulators are all not less than three.

3. The device for distributed detection of straightness of the working face of the scraper conveyor based on optical fiber sensing according to claim 1, wherein the reflecting film is a thin sheet coated with a metal film on the surface and having a thickness less than 1 mm.

4. A detection method of the device for distributed detection of straightness of the working face of the scraper conveyor based on optical fiber sensing according to claim 1, wherein
a broadband spectrum output by the broadband light source enters a first optical fiber circulator of the plurality of the first optical fiber circulators ranked first from a first port of the first optical fiber circulator of the plurality of the first optical fiber circulators, and is then output from a second port of the first optical fiber circulator of the plurality of the first optical fiber circulators; the light output from the second port of the first optical fiber circulator of the plurality of the first optical fiber circulators reaches a first optical grating and light with a wavelength of $\lambda_1$ is returned; the light with the wavelength of $\lambda_1$ enters a first optical fiber circulator of the plurality of the second optical fiber circulators ranked first through a first port of the first optical fiber circulator of the plurality of the second optical fiber circulators, and reaches a first reflecting film through a first collimator after being output from a second port of the first optical fiber circulator of the plurality of the second optical fiber circulators; the light with the wavelength of $\lambda_1$ returns back to the first optical fiber circulator of the plurality of the second optical fiber circulators through the first collimator from the second port of the first optical fiber circulator of the plurality of the second optical fiber circulators under the effect of the first reflecting film, and is output from a third port of the first optical fiber circulator of the plurality of the second optical fiber circulators; the light output from the third port of the first optical fiber circulator of the plurality of the second optical fiber circulators enters a first optical fiber circulator of the plurality of the third optical fiber circulators ranked first through a first port of the first optical fiber circulator of the plurality of the third optical fiber circulators, and enters an optical path analyzer through a single-mode optical fiber (SMF) after being output from a second port of the first optical fiber circulator of the plurality of the third optical fiber circulators;

light of the remaining wavelength that is not returned after the light is output from the second port of the first optical fiber circulator of the plurality of the first optical fiber circulators and reaches the first optical grating is continuously transmitted forward, enters from a first port of a second optical fiber circulator of the plurality of the first optical fiber circulators ranked second, and is output from a second port of the second optical fiber circulator of the plurality of the first optical fiber circulators; the light output from the second port of the second optical fiber circulator of the plurality of the first optical fiber circulators reaches a second optical grating and light with a wavelength of $\lambda_2$ is returned; the light with the wavelength of $\lambda_2$ enters a second optical fiber circulator of the plurality of the second optical fiber circulators ranked second through a first port of the second optical fiber circulator of the plurality of the second optical fiber circulators, and reaches a second reflecting film through a second collimator after being output from a second port of the second optical fiber circulator of the plurality of the second optical fiber circulators; the light with the wavelength of $\lambda_2$ returns back to the second optical fiber circulator of the plurality of the second optical fiber circulators through the second collimator from the second port of the second optical fiber circulator of the plurality of the second optical fiber circulators under the effect of the second reflecting film, and is output from a third port of the second optical fiber circulator of the plurality of the second optical fiber circulators; the light output from the third port of the second optical fiber circulator of the plurality of the second optical fiber circulators enters a second optical fiber circulator of the plurality of the third optical fiber circulators ranked second through a first port of the second optical fiber circulator of the plurality of the third optical fiber circulators, and enters the optical path analyzer through an SMF after being output from a second port of the second optical fiber circulator of the plurality of the third optical fiber circulators; and light of the remaining wavelength that is not returned after the light is output from the second port of the second optical fiber circulator of the plurality of the first optical fiber circulators and reaches the second optical grating is continuously transmitted forward, and the rest is deduced by analogy; therefore, light with the wavelengths of $\lambda_1, \lambda_2, \lambda_3, \ldots, \lambda_n$ all enters the optical path analyzer through the SMF; and the optical path analyzer calculates transmission distances of the different wavelengths of light, to obtain positions of different reflecting films; because the position points of the reflecting films are corresponding to positions on the scraper conveyor, the straightness of a working face of the scraper conveyor in a running direction is obtained according to connecting lines between the position points.

* * * * *

UNITED STATES PATENT AND TRADEMARK OFFICE
CERTIFICATE OF CORRECTION

PATENT NO. : 11,402,196 B2
APPLICATION NO. : 17/422756
DATED : August 2, 2022
INVENTOR(S) : Shaoyi Xu et al.

It is certified that error appears in the above-identified patent and that said Letters Patent is hereby corrected as shown below:

On the Title Page

Item (71) Applicant should read: China University of Mining and Technology, Jiangsu (CN)

Signed and Sealed this
Eleventh Day of October, 2022

Katherine Kelly Vidal
*Director of the United States Patent and Trademark Office*